Patented Aug. 7, 1934

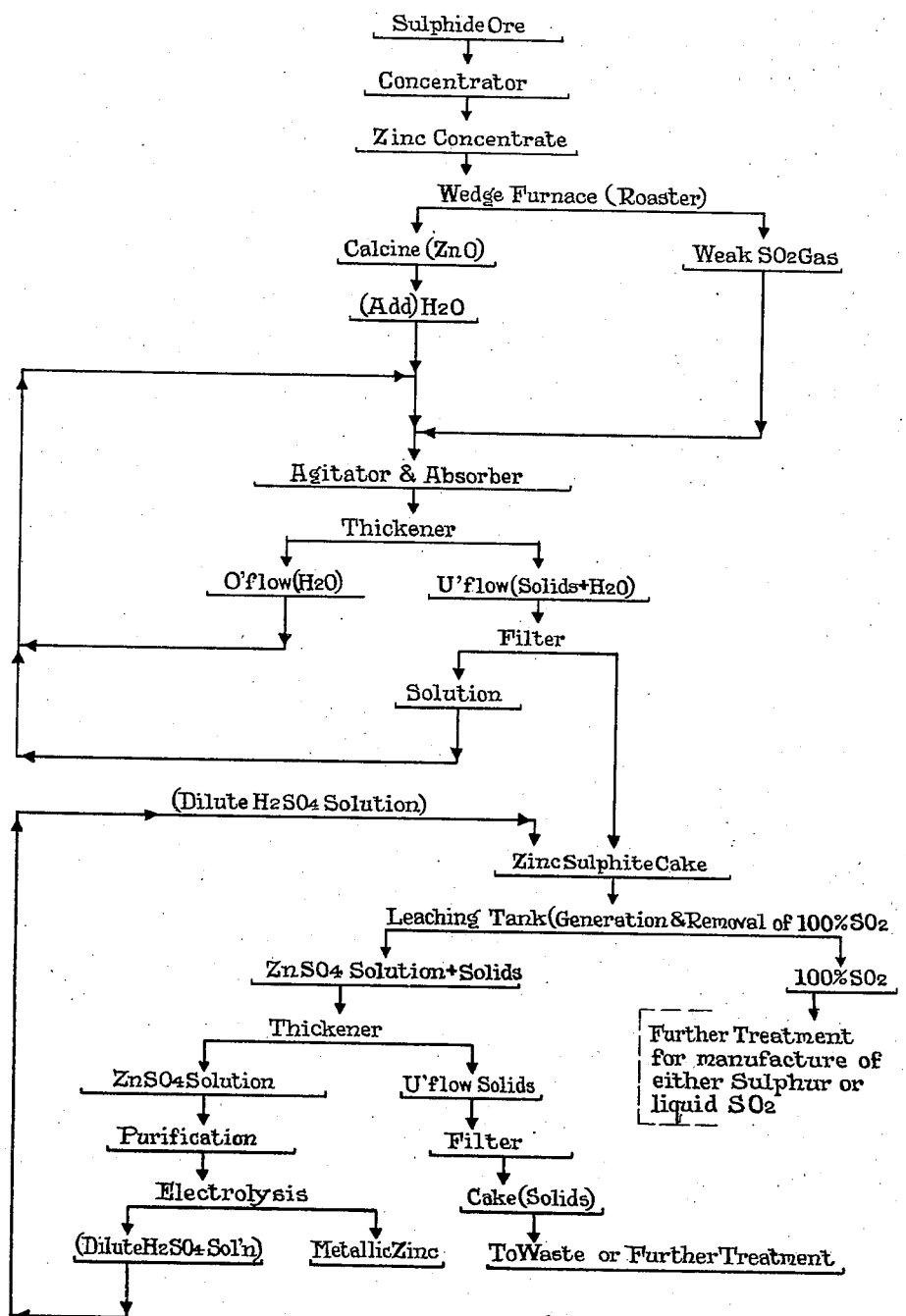

1,969,567

UNITED STATES PATENT OFFICE 1,969,567

PROCESS FOR THE TREATMENT OF ZINC SULPHIDE ORES

Frederick Eric Lee, Trail, British Columbia, Canada, assignor to The Consolidated Mining and Smelting Company of Canada, Limited, Montreal, Canada, a corporation of Canada Application August 6, 1932, Serial No. 627,712

8 Claims. (Cl. 204—15)

My invention relates to a method by which the extraction of zinc, from sulphide ores, as pure metallic zinc and the recovery of the sulphur dioxide in a highly concentrated form, capable of being economically manufactured into marketable elemental sulphur or liquid sulphur dioxide, may be simultaneously effected during the cycle of those operations necessary for the extraction of the zinc, involving the following steps: (a) roasting the ore or concentrates for converting the zinc sulphide into sulphur dioxide gas and zinc oxide; (b) leaching the resulting calcine with dilute sulphuric acid for dissolving the zinc oxide and forming a zinc sulphate solution; (c) purifying the sulphate solution; and (d) electrolytically decomposing it for depositing the metallic zinc and regenerating the dilute sulphuric acid; the object of the invention being to correlate with these steps, (e) the fixation of the low grade sulphur dioxide gas, and (f) the recovery of the gas in a highly purified state during the cycle of the operations for the extraction of the zinc.

In carrying out the invention the fixation is effected by passing the low grade sulphur dioxide gas from the roast through a water suspension of zinc oxide, in which an excess of zinc oxide is maintained for the reaction of the gas with it to form a crystalline relatively insoluble in water hydrated sulphite of zinc.

The slurry from the fixation is thickened and filtered and the thickener overflow and the filtrate from the underflow are returned to the fixation stage of the cycle and the filter cake, consisting essentially of zinc sulphite, zinc ferrite and the metallic oxides of the impurities contained in the roasted ore, is leached with the regenerated sulphuric acid solution from the electrolytic cells resulting in the evolution of the contained sulphur dioxide gas in a highly concentrated form of approximately 100% purity which can be conveniently and economically manufactured into elemental sulphur or liquid sulphur dioxide by any of the known methods and the dissolving of the zinc sulphite into zinc sulphate. The zinc sulphate solution resulting from the leaching is purified and then decomposed by electrolysis for the deposition of the metallic zinc and for the regeneration of the dilute sulphuric acid which is again returned to the leaching stage of the cycle of operations.

Sulphur dioxide gas from other metallurgical operations such as the roasting of copper and lead sulphide ores may be combined with the sulphur dioxide gas from the roasting of the zinc sulphide ore, and oxidized zinc products other than the zinc calcine may be introduced into the water suspension for the fixation of the gas.

The correlation of the steps for the fixation of low grade sulphur dioxide gas and the subsequent evolution of this gas in a highly concentrated form of approximately 100% purity to the other steps of the process for the electrolytic extraction of the zinc permits of the conversion of this low grade gas from a waste product, capable of becoming a nuisance in the atmosphere or one requiring additional expense to enrich it to a point where it can be used in the manufacture of sulphuric acid or other products to a high grade product which can be economically manufactured into marketable elemental sulphur or liquid sulphur dioxide.

In carrying out the invention as shown in the accompanying drawing illustrating a flow sheet of the method, the sulphide ore is mined, crushed and concentrated and the zinc concentrates are delivered into the roaster, which may be of any known type. The roasting is conducted in an oxidizing atmosphere for converting the zinc sulphide into low grade sulphur dioxide gas, zinc oxide, and the metallic oxides, such as ferrite, etc. of the impurities in the concentrated ore. The low grade sulphur dioxide gas and the calcine, consisting of the zinc oxide and the oxides of the metallic impurities, are cooled and delivered into the absorber in which the sulphur dioxide gas is passed through a water suspension of zinc oxide for the fixation of the gas and an excess of zinc oxide is maintained in the water suspension for preventing the formation of soluble bisulphite compounds. The reaction of the sulphur dioxide with the zinc oxide forms a crystalline relatively insoluble in water hydrated sulphite of zinc which may be expressed as follows:

$$ZnO + 2\tfrac{1}{2}H_2O + SO_2 = ZnSO_3.2\tfrac{1}{2}H_2O.$$

The slurry from the absorber is circulated through the thickeners, and the thickener overflow is returned, from the thickeners, direct to the absorber or fixation stage of the cycle, and the thickener underflow is passed through a filter from which the filtrate is returned to the absorber or fixation stage. The filter cake is transferred from the filter to the pachuca or agitator where it is leached with dilute sulphuric acid to form a zinc sulphate solution and to liberate the absorbed sulphur dioxide as a high grade gas of approximately 100% purity which may be subsequently treated by known methods for converting it into a marketable product such as elemental sulphur or liquid sulphuric acid and the leaching is preferably conducted in vacuo for aiding the evolution of the gas and for excluding the air from contact with it. From the pachuca the sulphate solution passes through the usual purification stages of the zinc extraction cycle to the electrolytic cells where it is decomposed for the deposit of the metallic zinc and the regeneration of the dilute sulphuric acid which is returned to the pachuca.

Having thus fully described my invention what I claim as new and desire to secure by Letters Patent is:—

1. A method for the recovery of pure sulphur dioxide from the mixed gases containing sulphur dioxide evolved during the treatment of sulphide ores which comprises the steps of forming a relatively water insoluble zinc sulphite by passing the mixed gases containing sulphur dioxide through a water suspension of zinc oxide, in which an excess of zinc oxide is present to inhibit the formation of water soluble zinc compounds; dissolving the solids containing the zinc sulphite with sulphuric acid to form zinc sulphate solution and release the absorbed sulphur dioxide gas at approximately 100% purity, recovering the sulphur dioxide, purifying the zinc sulphate solution to form zinc sulphate electrolyte, decomposing the zinc sulphate electrolyte for the deposition of metallic zinc and the regeneration of the sulphuric acid, and returning the regenerated sulphuric acid to the zinc sulphate solution formation stage.

2. A method for the recovery of pure sulphur dioxide from the mixed gases containing sulphur dioxide evolved during the treatment of sulphide ores which comprises the steps of forming a relatively water insoluble zinc sulphite by passing the mixed gases containing sulphur dioxide through a water suspension of zinc oxide, in which an excess of zinc oxide is present to inhibit the formation of water soluble zinc compounds; separating the solids containing the water insoluble zinc sulphite and the solution from the resulting slurry and returning the solution to the water suspension of zinc oxide and mixed gases; dissolving the solids containing the zinc sulphite with sulphuric acid to form zinc sulphate solution and release the absorbed sulphur dioxide gas at approximately 100% purity, recovering the sulphur dioxide, purifying the zinc sulphate solution to form zinc sulphate electrolyte, decomposing the zinc sulphate electrolyte for the deposition of metallic zinc and the regeneration of the sulphuric acid, and returning the regenerated sulphuric acid to the zinc sulphate solution formation stage.

3. A method for the recovery of pure sulphur dioxide from the mixed gases containing sulphur dioxide evolved during the treatment of sulphide ores which comprises the steps of forming a relatively water insoluble zinc sulphite by passing the mixed gases containing sulphur dioxide through a water suspension of zinc oxide, in which an excess of zinc oxide is present to inhibit the formation of water soluble zinc compounds; dissolving the solids containing the zinc sulphite with sulphuric acid to form zinc sulphate solution and release the absorbed sulphur dioxide gas at approximately 100% purity, said dissolution taking place in vacuo to increase the rate of elimination of the sulphur dioxide, recovering the sulphur dioxide, purifying the zinc sulphate solution to form zinc sulphate electrolyte, decomposing the zinc sulphate electrolyte for the deposition of metallic zinc and the regeneration of the sulphuric acid, and returning the regenerated sulphuric acid to the zinc sulphate solution formation stage.

4. A method for the recovery of pure sulphur dioxide from the mixed gases containing sulphur dioxide evolved during the treatment of sulphide ores which comprises the steps of forming a relatively water insoluble zinc sulphite by passing the mixed gases containing sulphur dioxide through a water suspension of zinc oxide, in which an excess of zinc oxide is present to inhibit the formation of water soluble zinc compounds; separating the solids containing the water insoluble zinc sulphite and the solution from the resulting slurry and returning the solution to the water suspension of zinc oxide and the mixed gases; dissolving the solids containing the zinc sulphite with sulphuric acid to form zinc sulphate solution and release the absorbed sulphur dioxide gas at approximately 100% purity, said dissolution taking place in vacuo to increase the rate of elimination of the sulphur dioxide, recovering the sulphur dioxide, purifying the zinc sulphate solution to form zinc sulphate electrolyte, decomposing the zinc sulphate electrolyte for the deposition of metallic zinc and the regeneration of the sulphuric acid, and returning the regenerated sulphuric acid to the zinc sulphate solution formation stage.

5. A method for the treatment of sulphide ores containing zinc for the recovery of zinc and pure sulphur dioxide which comprises the steps of roasting the zinc concentrates from zinc sulphide to zinc oxide and a mixed gas containing sulphur dioxide, forming a relatively water insoluble zinc sulphite by passing the mixed gas containing sulphur dioxide through a water suspension of zinc oxide, in which an excess of zinc oxide is present to inhibit the formation of water soluble zinc compounds; dissolving the solids containing the zinc sulphite with sulphuric acid to form zinc sulphate solution and release the absorbed sulphur dioxide gas at approximately 100% purity, recovering the sulphur dioxide, purifying the zinc sulphate solution to form zinc sulphate electrolyte, decomposing the zinc sulphate electrolyte for the deposition of metallic zinc and the regeneration of the sulphuric acid, and returning the regenerated sulphuric acid to the zinc sulphate solution formation stage.

6. A method for the treatment of sulphide ores containing zinc for the recovery of zinc and pure sulphur dioxide which comprises the steps of roasting the zinc concentrates from zinc sulphide to zinc oxide and a mixed gas containing sulphur dioxide, forming a relatively water insoluble zinc sulphite by passing the mixed gas containing sulphur dioxide through a water suspension of zinc oxide, in which an excess of zinc oxide is present to inhibit the formation of water soluble zinc compounds; separating the solids containing the water insoluble zinc sulphite and the solution from the resulting slurry and returning the solution to the water suspension of zinc oxide and the mixed gas; dissolving the solids containing the zinc sulphite with sulphuric acid to form zinc sulphate solution and release the absorbed sulphur dioxide gas at approximately 100% purity, recovering the sulphur dioxide, purifying the zinc sulphate solution to form zinc sulphate electrolyte, decomposing the zinc sulphate electrolyte for the deposition of metallic zinc and the regeneration of the sulphuric acid, and returning the regenerated sulphuric acid to the zinc sulphate solution formation stage.

7. A method for the treatment of sulphide ores containing zinc for the recovery of zinc and pure sulphur dioxide which comprises the steps of roasting the zinc concentrates from zinc sulphide to zinc oxide and a mixed gas containing sulphur dioxide, forming a relatively water insoluble zinc sulphite by passing the mixed gas containing sulphur dioxide through a water suspension of zinc oxide, in which an excess of zinc oxide is present to inhibit the formation of water soluble zinc compounds; dissolving the solids containing the zinc sulphite with sulphuric acid to form zinc sulphate solution and release the absorbed sulphur dioxide gas at approximately 100% purity, said dissolution taking place in vacuo to increase the rate of elimination of the sulphur dioxide, recovering the sulphur dioxide, purifying the zinc sulphate solution to form zinc sulphate electrolyte, decomposing the zinc sulphate electrolyte for the deposition of metallic zinc and the regeneration of the sulphuric acid, and returning the regenerated sulphuric acid to the zinc sulphate solution formation stage.

8. A method for the treatment of sulphide ores containing zinc for the recovery of zinc and pure sulphur dioxide which comprises the steps of roasting the zinc concentrates from zinc sulphide to zinc oxide and a mixed gas containing sulphur dioxide, forming a relatively water insoluble zinc sulphite by passing the mixed gas containing sulphur dioxide through a water suspension of zinc oxide, in which an excess of zinc oxide is present to inhibit the formation of water soluble zinc compounds; separating the solids containing the water insoluble zinc sulphite and the solution from the resulting slurry and returning the solution to the water suspension of zinc oxide and the mixed gas; dissolving the solids containing the zinc sulphite with sulphuric acid to form zinc sulphate solution and release the absorbed sulphur dioxide gas at approximately 100% purity, said dissolution taking place in vacuo to increase the rate of elimination of the sulphur dioxide, recovering the sulphur dioxide, purifying the zinc sulphate solution to form zinc sulphate electrolyte, decomposing the zinc sulphate electrolyte for the deposition of metallic zinc and the regeneration of the sulphuric acid, and returning the sulphuric acid to the zinc sulphate solution formation stage.

FREDERICK ERIC LEE.